A. C. SEEGER.
COMPRESSION GREASE CUP.
APPLICATION FILED MAR. 19, 1917.

1,256,269.

Patented Feb. 12, 1918.

Inventor,
August C. Seeger.
By Bakewell & Church Attys.

UNITED STATES PATENT OFFICE.

AUGUST C. SEEGER, OF EAST ST. LOUIS, ILLINOIS, ASSIGNOR OF ONE-SIXTH TO ROBERT E. CONWAY, OF ST. LOUIS, MISSOURI, AND ONE-SIXTH TO AUGUST F. SEEGER, JR., AND ONE-SIXTH TO SYLVENUS B. MORSE, BOTH OF EAST ST. LOUIS, ILLINOIS.

COMPRESSION GREASE-CUP.

1,256,269.　　　　Specification of Letters Patent.　　Patented Feb. 12, 1918.

Application filed March 19, 1917. Serial No. 155,833.

*To all whom it may concern:*

Be it known that I, AUGUST C. SEEGER, a citizen of the United States, residing at East St. Louis, Illinois, have invented a certain new and useful Improvement in Compression Grease-Cups, of which the following is a full, clear, and exact description, such as will enable others skilled in the art to which it appertains to make and use the same.

This invention relates to compression grease cups, and has for its main object to provide a compression grease cup which is so designed that it is adapted to be filled with grease by means of a grease gun.

Another object is to provide a grease cup which is so constructed that there is no possibility of grit or dirt entering the interior of the cup and becoming mixed with the grease therein, as usually occurs when a compression grease cup of the type now generally used is being filled with grease.

And still another object of my invention is to provide an inexpensive grease cup which is so constructed that there is no possibility of the cap or movable element of the cup becoming detached accidentally from the stationary element on which it is mounted.

To this end I have devised a compression grease cup that consists of a stationary element, a movable element or grease container preferably in the form of a cap that is adapted to be moved in one direction so as to cause the grease in same to be supplied to the part being lubricated, an opening through which grease can be introduced, preferably by means of a gun, into the interior of the cup, a closure for said opening, and means for preventing the cap from becoming detached accidentally from the stationary element on which it is mounted. The particular construction of the stationary element and the cap is immaterial, so long as they are constructed and combined in such a manner that the cap can be turned or moved in a direction so as to exert pressure on the grease in same, and thus force said grease out of a discharge opening in the stationary element.

Figure 1:
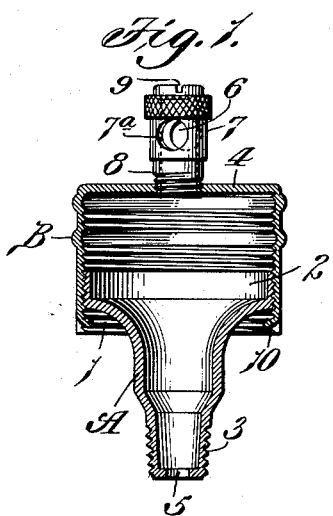
Figure 2:
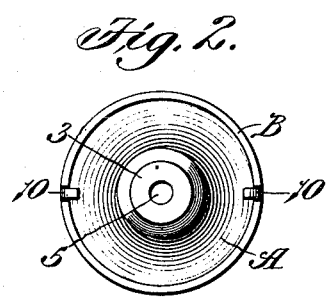

Figure 1 of the drawings is a vertical sectional view of a compression grease cup constructed in accordance with my invention; and Fig. 2 is a bottom plan view of said grease cup.

Referring to the drawings, which illustrate the preferred form of my invention, A designates the stationary element of the cup and B designates the movable element or grease container, which preferably consists of a cylindrical-shaped cap provided with internal screw threads 1 that coöperate with external screw threads on the periphery of the flange or head piece 2 at the upper end of the stationary element A. The stationary element A is of well known construction and is provided with an externally screw-threaded nipple 3 that is adapted to be screwed into the part in which the grease cup is mounted. When the cap B is screwed downwardly or turned in a direction to move the end wall 4 of same toward the head piece 2 at the upper end of the stationary element, the grease in the cup will be forced through the discharge opening 5 in the stationary element A to the bearing or part being lubricated.

Grease is introduced into the cup through a filling opening 6 that is normally closed by a cover 7. It is immaterial where said filling opening is located or what kind of a cover is used to close the filling opening 6, but I prefer to provide the cap B with a tubular-shaped device 8 closed at its upper end and having a filling opening 6 formed in the side of same, so that the nozzle of a grease gun can be introduced into said opening during the operation of filling the cup with grease. The cover 7 that I prefer to use for closing the filling opening 6 consists of a sleeve valve rotatably mounted on the device 8 and provided with a hole 7ª that alines with the filling opening 6 in the device 8 when the valve 7 is turned into a certain position. If desired, the device 8 may be provided at its upper end with a depression or groove 9 into which a screwdriver can be inserted to screw the device 8 into a threaded hole in the end wall 4 of the cap B, during the operation of assembling the device 8 with the cap B.

Means is provided for preventing the cap B from being removed from the stationary element A, so as to eliminate the possibility of dirt or grit becoming mixed with the grease in the cup and also to prevent the cap B from becoming lost, in case the grease cup is used on an automobile or an apparatus in which it is subjected to considerable vibration. The means that I prefer to use for this purpose on account of its simplicity and low cost, consists of one or more inwardly-projecting lugs 10 on the lower edge portion of the cap B that strike against the head portion 2 of the adjustable element A when the cap B is screwed upwardly its full distance or turned in a direction to move the end wall of same away from the stationary element A, the lugs 10 being preferably formed by forming slits in the lower end of the cap B and bending portions of same inwardly after the cap has been mounted in operative position on the stationary element A.

With a compression grease cup of the type now in general use it is necessary to completely remove the cap from the stationary element of the cup and pack the cap with grease either by means of the user's fingers or by submerging the cap in a mass of grease. This is not only a disagreeable and dirty task, but it generally results in the grit or dirt on the exterior of the stationary element or the cap of the cup becoming mixed with the grease that is introduced into the cup. Furthermore, a careless user is apt to twist or turn the coöperating threads on the interior of the cap and on the exterior of the stationary element A during the operation of screwing the cap onto said stationary element. If the grease cup is intended to be used on an automobile or other structure wherein it is subjected to considerable vibration, it is usually provided with a means for preventing the cap from working loose and being lost, the means that is generally used in compression grease cups of the type now in general use consisting of a spring-pressed ratchet tooth device that coöperates with ratchet teeth on the cap of the cup.

My improved compression grease cup is so designed that it can be filled with grease by means of a grease gun, thereby enabling the cup to be filled quickly and without the user's fingers becoming smeared with grease. Furthermore, it is so constructed that there is no possibility of dirt or grit becoming mixed with the grease in same, or the coöperating threads on the cap and on the stationary element of the cup becoming twisted during the operation of filling the cup, this, of course, being due to the fact that the cap B is permanently mounted on the stationary element A and is not intended to be removed therefrom. Still another desirable feature of my improved compression grease cup is that it can be manufactured at a low cost, on account of the fact that the means employed for preventing the cap from becoming accidentally detached from the stationary element consists of lugs which can be formed by bending the lower edge portion of the cap after the cap has been arranged in operative position on the stationary element of the cup.

Having thus described my invention, what I claim, and desire to secure by Letters Patent, is:

A grease cup, comprising an externally screw-threaded, stationary element provided with an annular shoulder, an internally threaded, cup-shaped device screwed onto said stationary element and having a threaded aperture in the top wall thereof, a device threaded into said aperture and having a filling opening therein, means for closing the filling opening, and a plurality of lugs formed by pairs of parallel slits in the lower edge of the side wall of said cup-shaped portion, said lugs being bent inwardly between said slits so as to project under the shoulder on the stationary element.

AUGUST C. SEEGER.